(12) United States Patent
Bashir et al.

(10) Patent No.: US 9,437,220 B2
(45) Date of Patent: Sep. 6, 2016

(54) VARYING DATA WRITER SIDE SHIELD GAP DISTAL THE ABS

(71) Applicant: Seagate Technology LLC, Cupertino, CA (US)

(72) Inventors: Muhammad Asif Bashir, Londonderry (GB); Mark Gubbins, Letterkenny (IE); Swaraj Basu, Londonderry (GB); Marcus B. Mooney, Quigley's Point (IE)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/036,698

(22) Filed: Sep. 25, 2013

(65) Prior Publication Data

US 2015/0085402 A1    Mar. 26, 2015

(51) Int. Cl.
*G11B 5/127* (2006.01)
*G11B 5/31* (2006.01)

(52) U.S. Cl.
CPC .................................. *G11B 5/3116* (2013.01)

(58) Field of Classification Search
CPC ............................ G11B 5/315; G11B 5/3116
USPC ................................ 360/125.3, 125.71, 128
See application file for complete search history.

(56) References Cited

U.S. PATENT DOCUMENTS

| | | | |
|---|---|---|---|
| 7,295,401 B2 | 11/2007 | Jayasekara et al. | |
| 8,031,433 B2 | 10/2011 | Yan et al. | |
| 8,264,798 B1 | 9/2012 | Guan et al. | |
| 8,295,008 B1 | 10/2012 | Sasaki et al. | |
| 8,323,727 B2 | 12/2012 | Pentek et al. | |
| 8,339,741 B2 | 12/2012 | Zhang et al. | |
| 8,365,393 B1 | 2/2013 | Benakli et al. | |
| 8,400,731 B1 | 3/2013 | Li et al. | |
| 2009/0002896 A1 | 1/2009 | Mallary et al. | |
| 2011/0002063 A1* | 1/2011 | Maruyama et al. | G11B 5/112 360/75 |
| 2011/0147222 A1* | 6/2011 | Pentek et al. | 205/170 |
| 2012/0250187 A1 | 10/2012 | Benakli et al. | |
| 2013/0242431 A1* | 9/2013 | Hosomi et al. | 360/119.02 |

FOREIGN PATENT DOCUMENTS

| | | |
|---|---|---|
| JP | 2009-016024 A | 1/2009 |
| JP | 2010-287289 A | 12/2010 |
| JP | 2013-025859 A | 2/2013 |

* cited by examiner

*Primary Examiner* — Gustavo Polo
(74) *Attorney, Agent, or Firm* — Hall Estill Attorneys at Law

(57) ABSTRACT

A data writing element may be configured at least with a write pole positioned adjacent a first shield along a first axis and adjacent a second shield along a second axis. The second shield may be separated from the write pole by a first gap distance on an air bearing surface (ABS) and by a second gap distance distal the ABS with the first and second gap distances meeting at a transition surface oriented parallel to the ABS.

20 Claims, 5 Drawing Sheets

VARYING DATA WRITER SIDE SHIELD GAP DISTAL THE ABS

SUMMARY

Various embodiments are generally directed to a magnetic element capable of programming data bits in various data storage environments.

Assorted embodiments tune a data writing element with at least a write pole positioned adjacent a first shield along a first axis and adjacent a second shield along a second axis. The second shield may be separated from the write pole by a first gap distance on an air bearing surface (ABS) and by a second gap distance distal the ABS with the first and second gap distances meeting at a transition surface oriented parallel to the ABS.

DETAILED DESCRIPTION

Reduction in the physical dimensions of data storage components has paved the way for reduced form factors and increased data capacity in data storage devices. In data writing aspects of a data storage device, magnetic shields are positioned about a magnetic flux emitting write pole and the downtrack trailing shield can be tuned to enhance magnetic write field, field gradient, field angle, and curvature sharpness. However, minimization of the physical size of data tracks on a data storage medium can result in magnetic flux being emitted laterally along a cross-track axis to inadvertently effect adjacent data bits that can be characterized as adjacent track interference (ATI) and erasure after write (EAW) conditions. Thus, industry has a continued goal of enhancing side shielding of a write pole, especially in reduced form factor, high areal data bit density data storage environments.

With these issues in mind, a data storage device can be configured with a write pole positioned adjacent a first shield along a first axis and adjacent a second shield along a second axis with the second shield separated from the write pole by a first gap distance on an air bearing surface (ABS) and by a second gap distance distal the ABS and with the first and second gap distances meeting at a transition surface oriented parallel to the ABS. The non-conformal side shield gap distance in relation to the ABS allows greater magnetic field and field gradients while maintaining the magnetic extent of the write pole. The side shield may be further tuned for material and construction as assorted embodiments form the side shield as a horizontal lamination of shielding sub-layers with each sub-layer contacting the ABS.

Figure 1:
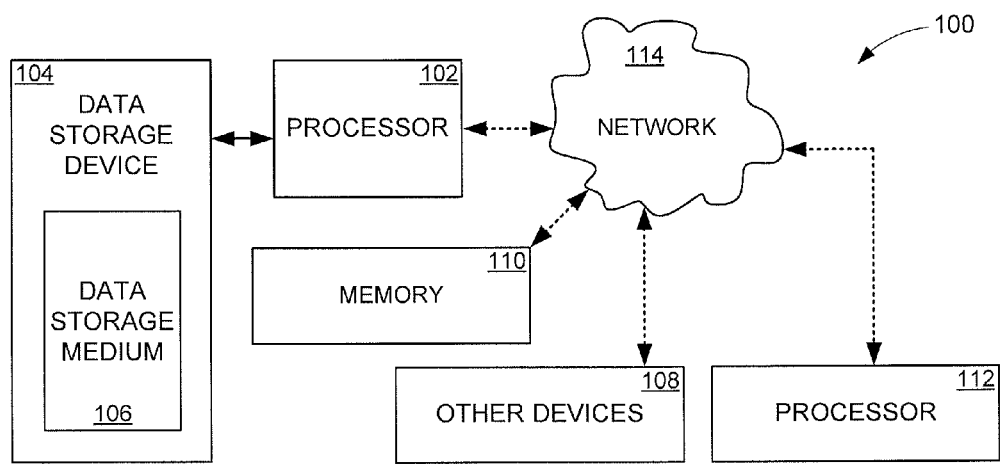
FIG. 1 is a block representation of an example data storage system constructed and operated in accordance with various embodiments.

It is contemplated that a tuned write pole and side shield can be employed in an unlimited variety of data storage environments. FIG. 1 provides a block representation of an example data storage environment 100 configured in accordance with various embodiments. The environment 100 has at least one processor 102, or controller, that communicates with and controls one or more data storage devices 104 individually or simultaneously. The data storage device 104 can be constructed and operated with at least one data storage medium 106 storing data in the form of data bits. Assorted embodiments may package the processor 102 within the data storage device 104 while other embodiments utilize multiple processors 102 internal and external to the data storage device 104.

The use of one or more local processors 102 can allow multiple data storage devices 104 to be employed as part of a local data storage scheme. The ability for the processor 102 to communicate to other devices 108, memory 110, and controllers 112 over a network 114 via appropriate protocol allows for other data storage schemes like redundant array of independent disks (RAID) and data caching while providing increased processing power. It should be noted that the network 114 can be wired and wireless to connect the local processor 102 to an unlimited variety and number of computing components, without limitation. As such, the data storage environment 100 can be tuned to utilize a diverse range of computing components to provide virtually any type of data storage capability, such as cloud computing, virtual machines, and redundant storage arrays.

Figure 2:
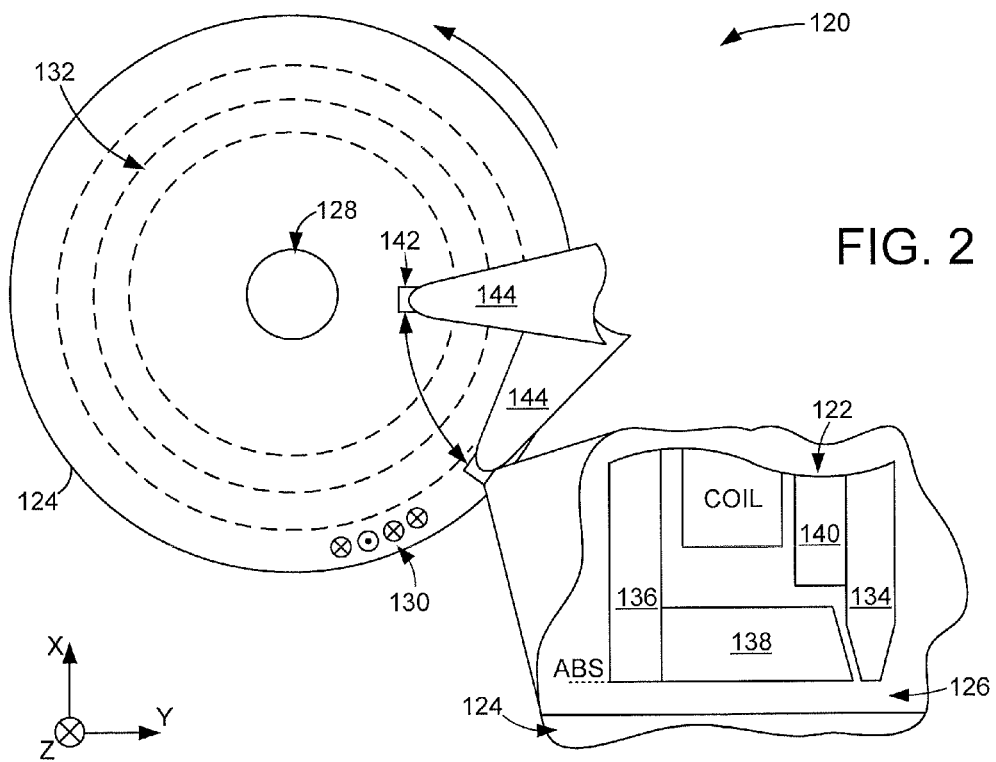
FIG. 2 illustrates a block representation of a portion of a data storage device capable of being used in the data storage device of FIG. 1.

FIG. 2 displays a block representation of a portion of an example data storage device 120 configured and operated in accordance with assorted embodiments. The data storage system 120 employs a data bit programming transducer 122 positioned adjacent to and separated from a data storage medium 124 by an air bearing 126. A spindle motor 128 can be controlled by one or more local and remote controllers to rotate the data storage medium 124 and produce a predetermined air bearing 126 size. Through actuated movement of the data transducer 122 in conjunction with the rotation of the data storage medium 124, selected data bits 130 as part of different data tracks 132 can be accessed to read and write predetermined magnetic polarities that correspond with logic states and digital memory.

The programming of one or more data bits 130 can be achieved with an unlimited variety of transducing configurations. As shown in the cross-sectional portion of FIG. 2, the data transducer 122 has a main pole 134 separated from a return pole 136 by a magnetic shield 138 and write gap on the air bearing surface (ABS). The respective poles 134 and 136 can have shapes and sizes conducive to completing a magnetic circuit from the main pole 134 to the return pole 136 through the data storage medium 134. The magnetic circuit can emit magnetic flux that is produced by a magnetic coil and emitted from the main pole 134 due to a yoke 140 conducting magnetic flux towards the main pole 134.

The transducing portion 122 may reside on a head gimbal assembly 142 portion of an actuating assembly 144 alone or in combination with other transducing means, such as a data sensing resistive sensor. Industry emphasis on increased data storage capacity has data tracks 132 with reduced widths in order to fit more data tracks 132 on the data storage medium 124. Such a reduction in data track 130 width can correspond with a more precise magnetic extent of the write pole 134, which is difficult to produce while aligning with the various data tracks 132 due to the skew angle associated with the actuating assembly 144 having a fixed pivot point. The minimization of data tracks 132 and wider range of skew angles can be compensated for with magnetic shields, but not without degrading performance as magnetic shunting between the main pole 134 and shields increases.

Figure 3:
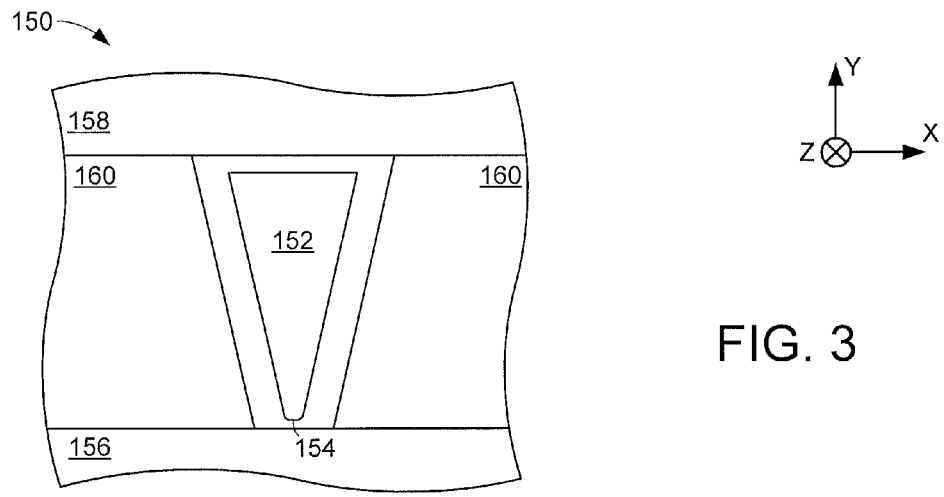
FIG. 3 shows an ABS view block representation of a portion of an example magnetic element capable of being used in the data storage device of FIG. 2.

FIG. 3 is an ABS view block representation of a portion of an example data writing element 150 capable of being used in the data storage device 120 of FIG. 2. The write pole 152 has a substantially trapezoidal shape that can aid in positioning magnetic flux at the leading edge 154, which can aid in programming data bits configured with a high areal density. Leading 156, trailing 158, and side 160 shields can further be tuned for size and shape to balance magnetic shielding with the risk of magnetic shunting.

While the trailing shield 158 can be tuned to enhance magnetic performance of the write pole 152, tuning the side shields 160 makes balancing shielding with shunting more difficult. As a result of such difficulties, magnetic flux can leak laterally from the write pole 152 and inadvertently effect data bits on adjacent data tracks in an erasure after write (EAW) and adjacent track interference (ATI) condition. Hence, ineffective side shields 160 can hinder any benefits afforded by tuning the write pole 152 and trailing shield 158.

Figure 4:
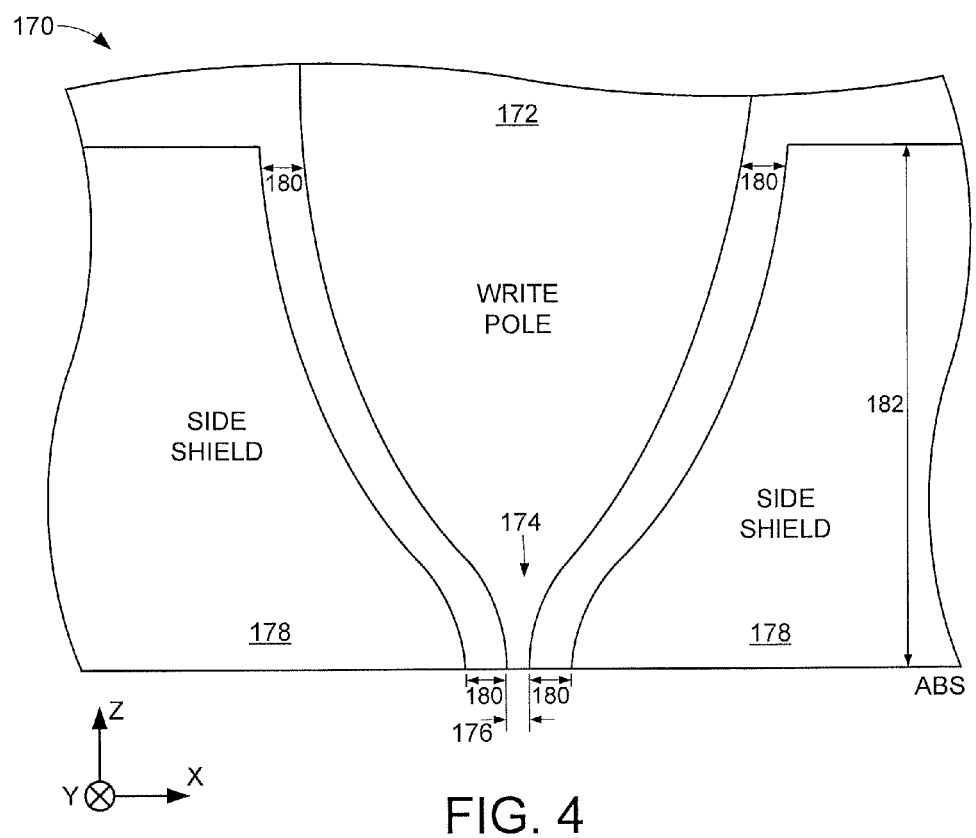
FIG. 4 displays a cross-sectional block representation of an example magnetic element constructed in accordance with various embodiments.

FIG. 4 provides a cross-sectional block representation of a portion of an example data writer 170 configured in accordance with some embodiments to have a substantially T-shaped cross-section write pole 172 that can enhance magnetic flux delivery to the ABS. The write pole 172 has continuously curvilinear sidewalls that converge to a throat region 174 proximal the ABS. The throat region 174 can be tuned for width 176 along the X axis and length from the ABS along the Z axis to control how magnetic flux flows towards the ABS, such as with increased flux strength and reduced saturation times.

Performance of the write pole 172 can further be tuned by adjusting the size and shape of the side shields 178 to balance magnetic shielding and the risk of shunting flux from the write pole 172. In the non-limiting embodiment of FIG. 4, the side shield 178 on opposite lateral sides of the write pole 172 is shaped with a sidewall that substantially matches the write pole sidewall and maintains a non-magnetic insulating gap distance 180 from the ABS to a predetermined distance 182 from the ABS. The uniform insulating gap distance 180 can aid in controlling the magnetic extent of the write pole 172 at the ABS, but is susceptible to unwanted magnetic shunting as the entire side shield sidewall approaches the write pole 172 and the insulating gap distance 180 decreases. Thus, the insulating gap distance 180 is kept at a length that decreases the risk of shunting, but does not provide precise enough shielding to accurately program high areal density data bits without EAW and ATI conditions arising.

Figure 5:
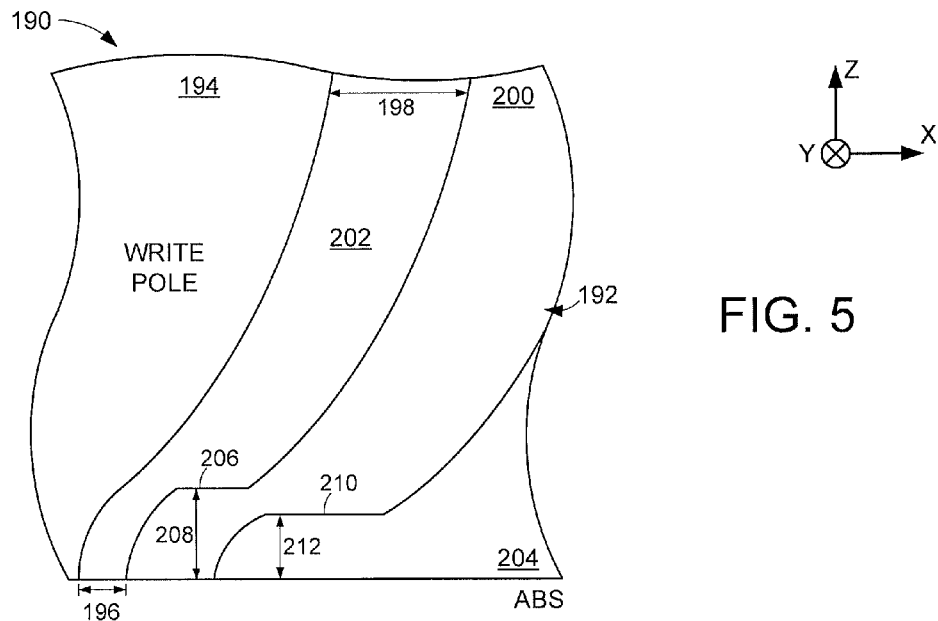
FIG. 5 illustrates a cross-sectional block representation of a portion of an example magnetic element configured in accordance with some embodiments.

The difficulties in balancing magnetic shunting with shielding in reduced form factor, high areal density data storage environments has rendered a horizontally laminated side shield with a varying insulating gap distance. FIG. 5 generally illustrates a cross-sectional block representation of a portion of an example data writer configured in accordance with assorted embodiments to employ a tuned side shield 192 separated from a write pole 194 by a gap distance 196 that varies in relation to the distance from the ABS to a larger gap distance 198 at a predetermined distance from the ABS. It should be noted that while a single side shield 192 is shown in FIG. 5, side shields on opposite lateral sides of the write pole 194 can be similarly or dissimilarly configured.

The side shield 192 is tuned with a first shield sub-layer 200 that is disposed between the insulating material 202 and a second shield sub-layer 204. Various embodiments configure the first 200 and second 204 shield sub-layers of the same material and magnetic flux densities while other embodiments configure the sub-layers 200 and 204 with different magnetic flux densities, such as 1.6 T and 1.0 T, which are less than the magnetic flux density of the write pole 194. The varying magnetic flux densities can complement the varying gap distance 196 to provide optimized magnetic shielding on the ABS while reducing magnetic shunting distal the ABS by separating the rear portion of the write pole 194 from the side shield 192 by a secondary distance 198 that is greater than the gap distance 196 at the ABS.

While a mismatched write pole and side shield sidewall construction can create a varying gap distance 196, gradual increases in gap distance 196 may not sufficiently reduce shunting between the write pole 194 and side shield 192. Accordingly, the first shield sub-layer 200 is configured with a transition surface 206 that is oriented substantially parallel to the ABS and abruptly increases the separation of the write pole 196 and the side shield 192. The transition surface 206 may be tuned to be any variety of angular orientations, lengths, and distances 208 from the ABS, but some embodiments tune the distance 208 with the gap distance 196 to provide optimized shielding at the ABS without decreasing the size of the first shield sub-layer 200 to the point where it can be easily saturated by shielded magnetic flux, which can create a magnetic domain that promotes EAW and ATI conditions.

It is contemplated that the first shield sub-layer 200 is the only sub-layer with a transition surface 206. However, the side shield 192 may further be tuned to have multiple transition surfaces, such as the secondary transition surface 210 constructed in the second shield sub-layer 204. The secondary transition surface 210 may be tuned for size and shape to further control the magnetic shielding and shunting proximal the ABS. The secondary transition surface 210 is tuned in FIG. 5 to have a throat distance 212 that is less than the distance 208 from the ABS to the first transition surface 206. Such tiered configuration of the magnetic flux densities, transition surfaces 206 and 208, and throat distances 208 and 212 can improve write pole 194 performance by optimizing magnetization strength and downtrack magnetization gradient while decreasing the risk of EAW and ATI conditions.

Figure 6:
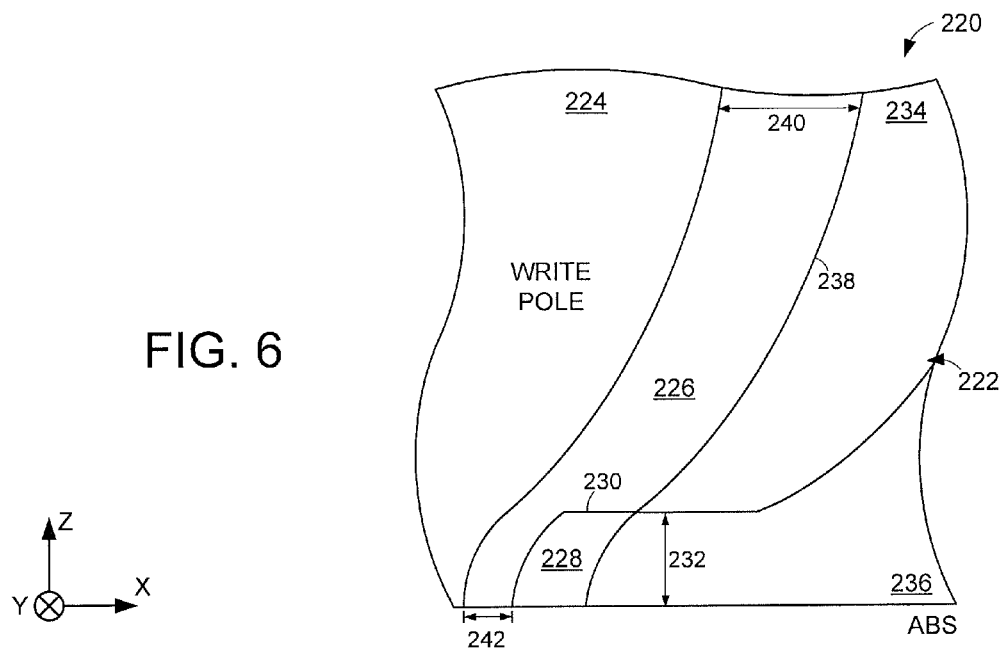
FIG. 6 is a cross-sectional block representation of a portion of an example magnetic element constructed in accordance with assorted embodiments.

FIG. 6 displays a cross-sectional block representation of a portion of another example data writer 220 constructed in accordance with various embodiments to provide a tuned side shield 222 separated from a write pole 224 by a non-magnetic insulating layer 226. While not limiting or required, the first shield sub-layer 228 can continuously extend from the ABS to a common transition surface 230 orientated to be substantially parallel to the ABS and X axis. The isolation of the first shield sub-layer 228 to the area proximal the ABS can allow for a high magnetic flux density material to be utilized, such as a 2.4 T material, to provide enhanced magnetic shielding at the ABS without unduly increasing shunting risk distal the ABS. In some embodiments, the first shield sub-layer 228 is constructed of the same material as the write pole 224 and extends no farther than the throat height 232 of the common transition surface 230 along the Z axis.

The size and shape of the write pole facing sidewall of the first shield sub-layer 228 can be tuned with respect to the second 234 and third 236 shield sub-layers to provide a comprehensive side shield 222 that accommodates reduced data track widths without increasing the risk of EAW and ATI conditions. As shown, the second shield sub-layer 234 can be configured with a write pole facing sidewall 238 that has a matching shape to the write pole 224, but is separated from the write pole 224 by a distal separation distance 240 that is greater than the ABS separation distance 242 at the ABS. Positioning the second shield sub-layer 234 distal the ABS allows the third shield sub-layer 236 to extend laterally from the first shield sub-layer 228 along the ABS to balance shielding and shunting with different magnetic flux density materials. That is, the first 228, second 234, and third 236 shield sub-layers can have differing magnetic flux densities that function in concert with the various sub-layer shapes to provide optimized shielding at the ABS while reducing shunting risk distal the ABS.

Figure 7:
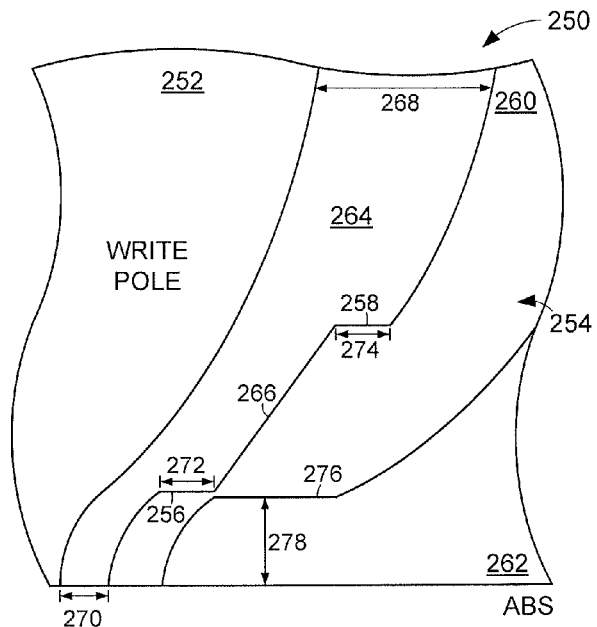
FIG. 7 displays a cross-sectional block representation of a portion of an example magnetic element configured in accordance with various embodiments.

It is contemplated that the first shield sub-layer 228 has a magnetic moment that is greater than the second 234 and third 236 shield sub-layers to enhance cross-track magnetic field gradient, which can be beneficial in shingled magnetic recording (SMR), while reducing side shield 222 magnetic saturation issues. FIG. 7 shows a cross-sectional block representation of a portion of another example data writer 250 that optimized write pole 252 performance by tuning the side shield 254 with multiple transition surfaces 256 and 258 in accordance with assorted embodiments. As illustrated, the side shield 254 has a first shield sub-layer 260 disposed between a second shield sub-layer 262 and non-magnetic insulating material 264.

The first shield sub-layer 260, in some embodiments, has a higher flux density and magnetic moment than the second shield sub-layer 262, which operates in concert with the multiple transition surfaces 256 and 258 to enhance write pole 252 magnetic field gradient while decreasing the risk of shunting distal the ABS. The first shield sub-layer 260 is tuned to have both continuously curvilinear sidewall portions at the ABS that mirrors the shape of the write pole 252 and at least one continuously linear sidewall 266 that connects the transition surfaces 256 and 258 at a predetermined takeoff angle, such as 60° and 45° with respect to the ABS and X axis. Such linear sidewall 266 configuration can allow for tuned magnetic saturation in the side shield 254 that is complemented by an increased separation distance 268 distal the ABS compared to the gap separation distance 270 on the ABS.

Implementation of multiple transition surfaces 256 and 258 further allows the lengths 272 and 274 of those respective surfaces along the X axis to be tuned to be similar or dissimilar to vary the amount of non-magnetic material between the write pole 252 and the side shield 254 at various horizontal planes. The side shield 254 may further comprise a tuned second shield sub-layer 262 that has a third transition surface 276 positioned a different throat height 278 from the ABS than the transition surfaces 256 and 258 of the first shield sub-layer 260. By tuning the material, shape, and size of the respective shield sub-layers 260 and 262, robust magnetic shielding can be experienced at the ABS to optimize the magnetic extent of the write pole 252 while increased separation distances 268 distal the ABS optimize magnetic field gradient and flux channeling.

With decreasing physical dimensions for data writing elements, construction of precise side shield 254 features and sub-layers of differing materials can increase manufacturing complexity compared to a side shield that has a uniform separation distance 270 throughout the length of the side shield 254 along the Z axis. These issues and others have rendered the example data writer 280 of FIG. 8, of which a portion is displayed configured in accordance with various embodiments. The data writer 280 has a uniform separation distance 282 provided by substantially conformal write pole 284 and side shield 286 sidewalls separated by a non-magnetic insulating material 288.

The side shield sidewall facing the write pole 184 is tuned to have a high magnetic moment portion 290 positioned on the ABS and a low magnetic moment portion 292 continuously extending from the transition surface 294 of the high magnetic moment portion 290 to a predetermined plane distal the ABS. In various embodiments, the high magnetic moment portion 290 is constructed of a material having the same flux density as the write pole 284, such as 2.4 T, while the low magnetic moment portion 292 has a magnetic flux density of less than 1 T to reduce the risk of magnetic side shield 286 saturation distal the ABS, which minimizes the chances of side track erasure (STE) conditions and inadvertent magnetic shunting with the write pole 284.

Tuning the high 290 and low 292 magnetic portions to substantially match the contour of the write pole 284 along the Z axis, perpendicular to the ABS, in combination with the low magnetic moment material of portion 292 allows the side shield 286 to be configured in close proximity to the write pole 284 to increase control of the magnetic extent of the write pole 284 without increasing the risk of shunting and side shield 286 saturation. The side shield 286 may further be tuned by adjusting the distance 296 of the transition surface 294 from the ABS. Such tuning can precisely control the magnetic shielding at the ABS by determining how much high magnetic moment material is present proximal the write pole tip 298 portion of the write pole 284 on the ABS.

The tuned configuration of the transition surface 294 can further determine the shape and size of the first 300 and second 302 shield sub-layers. That is, extension of the transition surface 294 laterally along the X axis, parallel to the ABS, sets the shape of the first shield sub-layer 300, which may be constructed of dissimilar magnetic flux density than the low 290 and high 292 magnetic moment portions. The first shield sub-layer 300 can be configured to have any shape and size, but can gradually increase in length from the ABS distal the write pole 284 laterally, as shown. The combination of the linear transition surface 294 and curvilinear separation surface 304 serves to define the shape and size of the second shield sub-layer 302, which can be tuned to position material with a predetermined magnetic flux density in contact with the low magnetic moment portion 292 and provide magnetic shielding distal the ABS.

Positioning multiple different side shield 286 layers on the ABS defines a horizontal lamination that may, or may not have the second shield sub-layer 302 contacting the ABS. In other words, a horizontal lamination side shield 286 has at least two different shield layers and may further have three layers in the event the second shield sub-layer 302 is constructed to continuously extend from the ABS. It can be appreciated that the tuned construction of the side shield 286 with differing materials and shaped layers allows for precise balance of magnetic shielding at the ABS and reduced side shield 286 saturation distal the ABS, which can optimize write pole performance as the risk of EAW, ATI, and STE conditions are diminished.

It should be noted that while the various data writers of FIGS. 5-8 have multiple sub-layers of differing materials, such construction is not required or limiting as some, or all, of a side shield can be configured as from a single material. In the event a single material is utilized to form a side shield, the sub-layers may be sequentially constructed so that the seams, or boundaries, can exist between the sub-layers to tune the magnetic shielding characteristics of selected portions of the side shield.

Figure 9:
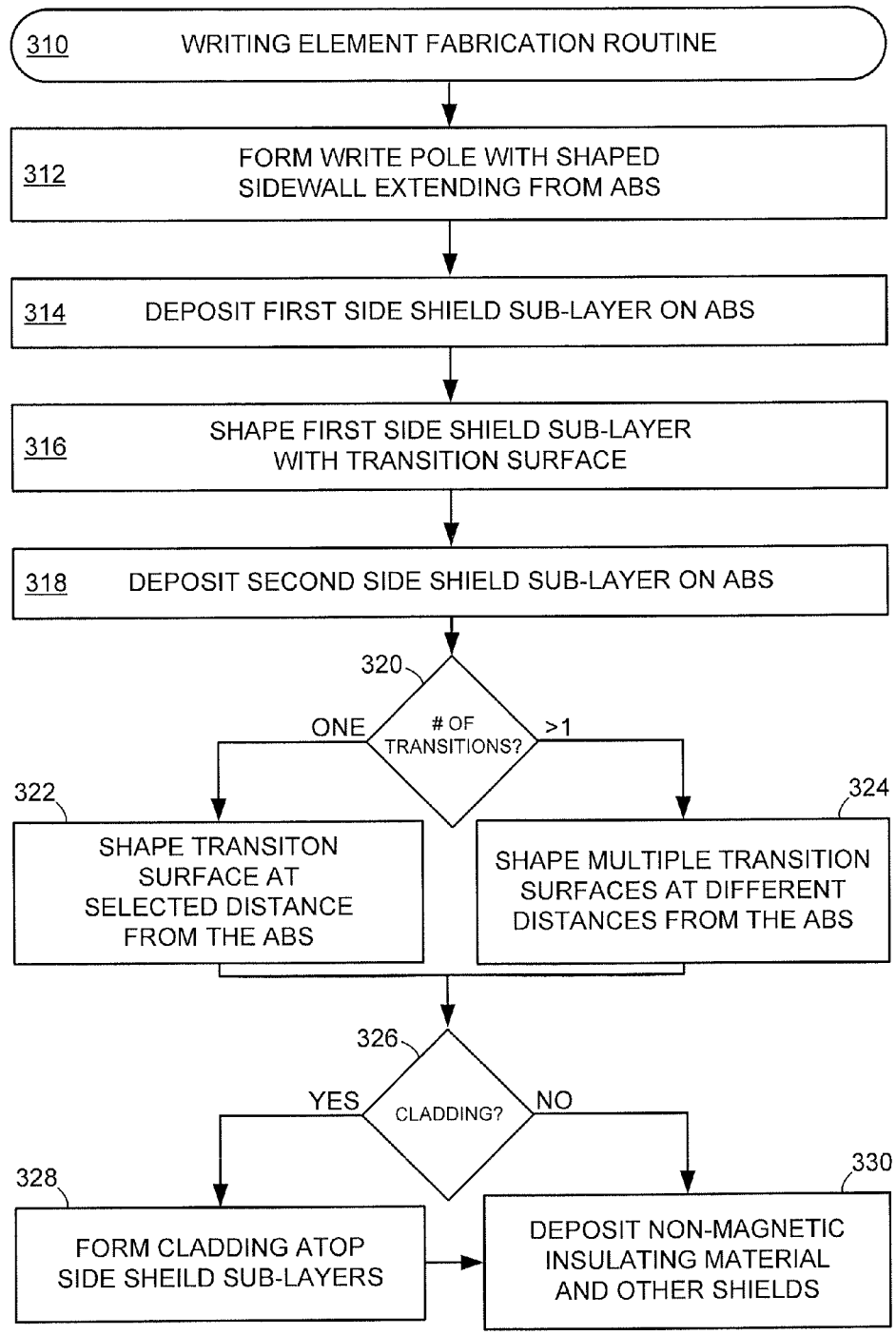
FIG. 9 provides a flowchart of an example writing element fabrication routine carried out in accordance with assorted embodiments.

With the various tuning capabilities of a side shield 286, fabrication of the data writer 280 can involve an unlimited variety of steps and processes, none of which are required or limiting. However, assorted embodiments carry out a writing element fabrication routine 310 to construct a tuned side shield, as illustrated in FIG. 9. Initially, step 312 can form a write pole with a shaped sidewall continuously extending from the ABS. It is contemplated that the write pole sidewall may have a T-shape cross-section with linear and curvilinear sidewall surfaces. It is further contemplated that step 312 is carried out with a deposition of material and the subsequent removal of portions of the material, such as through masking and etching operations.

The formation of the write pole in step 312 can advance routine 310 to step 314 where a first side shield sub-layer is deposited on the ABS. The first side shield sub-layer may be positioned distal or proximal the ABS and continuously extend any distance from the ABS before step 316 shapes the first side shield sub-layer with a transition surface that is oriented substantially parallel to the ABS. Some embodiments characterize sub-layer 204 of FIG. 5 as the first side shield sub-layer due to its foundational position on the ABS and away from the write pole.

Next, step 318 deposits a second side shield sub-layer atop the first side shield sub-layer. It is noted that the first and second side shield sub-layers can differ in material, size, shape, and number of transition surfaces to balance shielding with shunting and the risk of side shield magnetic saturation. The number of transition surfaces can particularly be determined in decision 320 before step 322 or 324 shapes a single transition surface or multiple separate transition surfaces at predetermined distance(s) from the ABS, respectively. For step 324, the multiple transition surfaces may be formed independently or concurrently with one or more material removal processes. It is noted that the transition surface formed in step 316 may differ or be the same distance from the ABS, as illustrated by distances 208 and 212 of FIG. 5.

Figure 8:
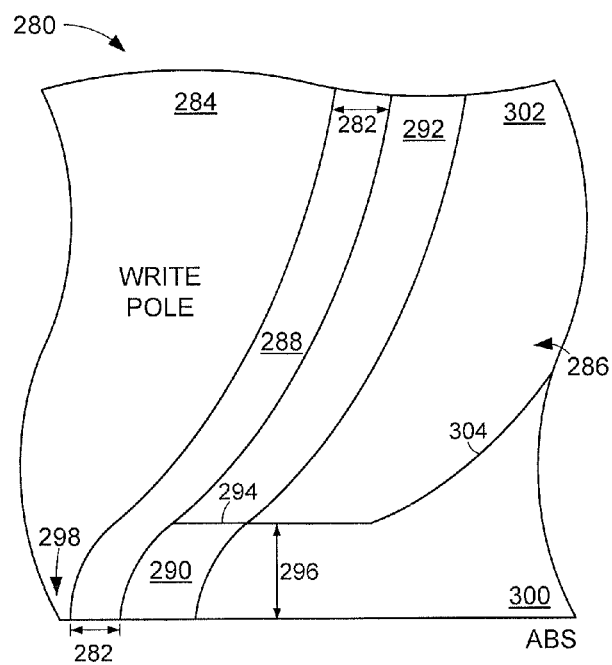
FIG. 8 displays a cross-sectional block representation of a portion of an example magnetic element constructed in accordance with some embodiments.

The formation of at least one transition surface in either step 322 or 324 proceeds to decision 326 where the installation of a low magnetic moment cladding layer, such as layer 292 of FIG. 8, is evaluated. If a cladding layer is chosen, step 328 then forms the cladding layer atop a transition surface and continuously extending atop at least one side shield sub-layer. In the event no cladding layer is to be formed, or at the conclusion of the cladding layer being formed in step 328, step 330 deposits a non-magnetic insulating layer between the side shield and the write pole before constructing other shields, such as the downtrack trailing shield.

Through the various steps and decisions of routine 310, a magnetic writing element can be constructed with optimized magnetic shielding and shunting by tuning the side shield as a horizontal lamination of sub-layers that provide different structural and operational characteristics. It should be noted, however, that the various steps and decisions of routine 310 shown in FIG. 9 are not required or limited as the various decisions and steps can be omitted, changed, and added. As a non-limiting example, an additional step or series of steps could specifically shape the write pole facing sidewalls of the side shields to match or be dissimilar than the write pole sidewall, which may involve utilizing linear and curvilinear surfaces to define the side shield sidewall spanning multiple side shield sub-layers.

With the various tuning capabilities with a side shield, magnetic performance of the write pole can be optimized through more precise magnetic shielding at the ABS and less risk of shunting and side shield saturation distal the ABS. The ability to configure the side shield with sub-layers of differing materials and shapes in a horizontal lamination allows for improved magnetic field gradient downtrack as well as effective magnetic field in a cross-track direction. Moreover, the varying side shield separation distance from the write pole distal the ABS can reduce the risk of EAW, ATI, and STE conditions that can jeopardize the data integrity of a rotating data storage device, especially in high data bit areal density environments.

Additionally, while the embodiments have been directed to magnetic programming, it will be appreciated that the claimed technology can readily be utilized in any number of other applications, such as data reading sensors. It is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. An apparatus comprising a write pole adjacent a side shield along a first axis, the side shield having first and second shield sub-layers having different magnetic flux densities and contacting at a first transition surface oriented parallel to an air bearing surface (ABS), the first transition surface separating the first shield sub-layer from the second shield sub-layer, the second sub-layer being separated from the ABS and comprising a lower magnetic flux density than the first shield sub-layer.

2. The apparatus of claim 1, wherein a trailing shield is separated from the write pole along a second axis and is positioned downtrack from the write pole.

3. The apparatus of claim 2, wherein the side shield is positioned laterally adjacent the write pole and uptrack from the trailing shield.

4. The apparatus of claim 3, wherein the write pole is disposed between matching side shields.

5. The apparatus of claim 1, wherein the write pole comprises a first sidewall extending from the ABS with a first shape, the side shield comprising a second sidewall extending from the ABS with a second shape, the first and second shapes being different.

6. The apparatus of claim 1, wherein the side shield comprises a second transition surface oriented parallel to the ABS, the first and second transition surfaces separated from the ABS by different distances.

7. The apparatus of claim 6, wherein the first and second transition surfaces have different lengths as measured parallel to the ABS.

8. The apparatus of claim 1, wherein the first transition surface is continuously linear.

9. A magnetic element comprising a write pole adjacent a side shield along a first axis, the side shield configured as a horizontal lamination with first, second, and third shield sub-layers having different magnetic flux densities meeting at a first transition surface oriented parallel to the air bearing surface (ABS), the first and second shield sub-layers each contacting the ABS, the third shield sub-layer separated from the ABS by the first shield sub-layer.

10. The magnetic element of claim 9, wherein the first and second sub-layers continuously extend from the ABS.

11. The magnetic element of claim 9, wherein the first sub-layer comprises the first transition surface and the second sub-layer comprises a second transition surface oriented parallel to the ABS.

12. The magnetic element of claim 11, wherein the first and second transition surfaces are positioned at different distances from the ABS.

13. The magnetic element of claim 11, wherein the first and second transition surfaces are positioned at a common distance from the ABS.

14. The magnetic element of claim 9, wherein the first sub-layer has a greater magnetic flux density than the second and third sub-layers.

15. The magnetic element of claim 9, wherein the first sub-layer extends no farther than the first transition surface in a direction perpendicular to the ABS.

16. The magnetic element of claim 11, wherein the side shield comprises a third sub-layer that continuously extends from the second transition surface without contacting the ABS.

17. The magnetic element of claim 16, wherein the side shield comprises a fourth sub-layer that continuously extends from the first transition surface without contacting the ABS.

18. The magnetic element of claim 16, wherein the side shield comprises a fourth sub-layer that has a different magnetic moment than the first sub-layer.

19. The magnetic element of claim 9, wherein the first sub-layer comprises a write pole facing sidewall configured with a matching shape as a side shield facing sidewall of the write pole.

20. A method comprising:
positioning a write pole adjacent a side shield along a first axis, the side shield comprising first and second sub-layers having different magnetic flux densities; and
configuring the first and second sub-layers to contact at a transition surface oriented parallel to the ABS, the transition surface separating the first shield sub-layer from the second shield sub-layer, the second sub-layer being separated from the ABS and comprising a lower magnetic flux density than the first shield sub-layer.

\* \* \* \* \*